United States Patent [19]

Schirmer

[11] Patent Number: 5,142,842
[45] Date of Patent: Sep. 1, 1992

[54] METHOD FOR MAKING A FILM/FOIL PANEL

[75] Inventor: Henry G. Schirmer, Spartanburg, S.C.

[73] Assignee: W. R. Grace & Co.-Conn., Duncan, S.C.

[21] Appl. No.: 450,107

[22] Filed: Dec. 13, 1989

[51] Int. Cl.$^5$ .................... B65B 11/52; B32B 31/00
[52] U.S. Cl. ............................... 53/427; 53/509; 156/213; 156/214; 156/285; 156/292
[58] Field of Search ............... 426/124, 126; 53/427, 53/509, 453, 454; 206/497, 484; 312/401, 406, 406.1; 62/DIG. 13; 52/406; 156/292, 213, 214, 285; 428/74–76; 220/423, 450

[56] References Cited

U.S. PATENT DOCUMENTS

| Re. 30,009 | 5/1979 | Perdue et al. | 53/433 |
| 3,007,596 | 11/1961 | Matsch | 62/DIG. 13 |
| 4,815,602 | 3/1989 | Schirmer | 206/497 |
| 4,957,820 | 6/1989 | Heyes et al. | 428/623 |
| 4,980,210 | 12/1990 | Heyes | 428/359 |
| 4,985,106 | 1/1991 | Nelson | 428/76 X |
| 5,018,328 | 5/1991 | Cur et al. | 52/406 |
| 5,051,144 | 9/1991 | Kistner | 156/213 X |
| 5,098,498 | 3/1992 | Hale et al. | 156/213 |

FOREIGN PATENT DOCUMENTS

2057582-A  9/1990  Japan.

*Primary Examiner*—Michael W. Ball
*Assistant Examiner*—Adrienne C. Johnstone
*Attorney, Agent, or Firm*—William D. Lee, Jr.; Jennifer L. Skord; Mark B. Quatt

[57] ABSTRACT

A film/foil panel comprises a substrate such as a thermoformed film; a first film/foil combination; an insulating material; a second film/foil combination; a top web in sealing relationship to the substrate; the film/foil combinations substantially enclosing therebetween the insulating material; and the insulating material and enclosing film/foil combinations disposed between and enclosed by the substrate and top web.

1 Claim, 1 Drawing Sheet

METHOD FOR MAKING A FILM/FOIL PANEL

FIELD OF THE INVENTION

The present invention relates to packaging and packaging methods, and more specifically to film/foil panels useful in connection with vacuum skin packaging (VSP) techniques.

BACKGROUND OF THE INVENTION

Vacuum skin packaging is a well known technique for packaging food and non-food products in such a way that a tight fitting, often clear package is provided.

Of particular interest is U.S. Pat. No. Re. 30,009 (Perdue et al) teaching the use of a chamber into which a product to be packaged is brought. The product is supported on an impervious supporting member. A top film is placed over the product, and while in a dome, the top film is brought up against a heated portion of the dome by vacuumization and/or differential air pressure to heat and soften the film, whereupon by release of vacuum and/or vacuumization the heated and softened film drapes over the product and supporting member to form a vacuum skin package.

Also of interest is U.S. Pat. No. 4,815,602 (Schirmer) which discloses a vacuum skin package in which two metallic sheets, enclosing a product, are brought together by the use of a vacuum skin package process.

In the packaging art, it is sometimes desirable to place a product between two sheets of a material which is not heat sealable under normal operating conditions. An example of such a material is metallic foil such as aluminum foil, which provides excellent moisture barrier properties for a moisture sensitive product, but is not readily heat sealable.

When a product placed between two such sheets is to be enclosed between the sheets, it may be necessary to encapsulate the product and sheets in a larger overwrap. Even in such cases, the seams formed by the two sheets of material may not be substantially closed and some or all of the advantages of the use of such material can be lost.

An alternative to an overwrap is the use of a sleeve or other shaped pouch into which the product and pair of sheets may be disposed. This requires of course additional material, additional processing steps and costs, and can still require the use of an overwrap in order to provide a display container or shipping container for the product.

It has now been discovered that a film/foil panel, especially a vacuum panel can be produced having a core of insulating material, wrapped by film/foil combinations, and with the insulating material and film/foil combinations brought together in a substantially closed arrangement by means of a vacuum skin packaging process.

SUMMARY OF THE INVENTION

In one aspect of the present invention, a method for making a film/foil panel comprises forming a thermoformable film to form a cavity; lining the cavity with a first film/foil combination; placing an insulating material into the lined cavity; placing a second film/foil combination on the insulating material; applying a top web over the second film/foil combination and in sealing arrangement with the thermoformable film, by a vacuum skin packaging process; and simultaneously with the application of the top web, bringing the first and second film/foil combinations together to substantially enclose the insulating material between the film and top web.

In yet another aspect of the invention, a film/foil panel comprises a substrate; a first film/foil combination; an insulating material; a second film/foil combination; a top web in sealing relationship to the thermoformed film; the film/foil combinations substantially enclosing therebetween the insulating material; and the insulating material and enclosing film/foil combinations disposed between and enclosed by the substrate and top web.

BRIEF DESCRIPTION OF THE DRAWINGS

The invention may be further understood by reference to the sole drawing figure described below, wherein.

DESCRIPTION OF THE PREFERRED EMBODIMENTS

Figure 1:
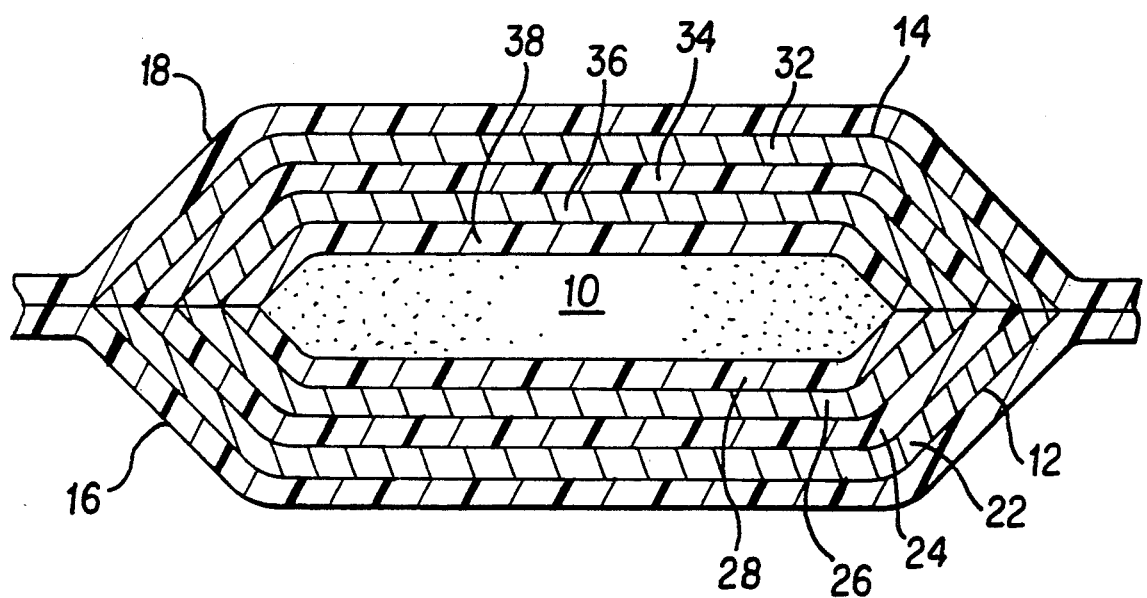
FIG. 1 is a schematic side view of a vacuum panel in accordance with the present invention.

Referring to FIG. 1, an insulating material is disposed between a first film/foil combination 12 and a second film/foil combination 14. The insulating material may be a silica powder or other insulating medium.

First film/foil combination 12 and second film/foil combination 14 are preferably made up of the same material, and each combination preferably comprises at least one polymeric film and at least one metallic foil.

Polymeric films useful in the present invention are typically thermoplastic and can themselves be of monolayer or multilayer construction. They can be formed by conventional lamination, extrusion, coextrusion, extrusion coating, or other techniques well known in the art. Compositionally, these films can be made up of polyolefinic or polymeric materials, and can also include polyvinylidene chloride or vinylidene chloride copolymer, or ethylene vinyl alcohol copolymer. Ethylene polymers and copolymers are preferred polyolefins. These films can optionally be cross-linked e.g. by irradiation or by the use of chemical agents.

The foils of the present invention are preferably made from a material that has a low gas transmission rate. Especially preferred materials are metal foils such as aluminum foil and steel foil.

The film and foil of each combination are preferably arranged in an alternating manner. The number of layers of film and foil respectively, and the thickness of each layer, can be chosen based on considerations such as desired end-use, final thickness, strength requirements, insulating properties, and the like. The layers of film and foil can be placed individually, or a prelaminated film/foil combination can be used. A prelaminate can also be used in conjunction with one or more additional layers of film and/or foil.

In practice, and by reference to the sole drawing, a thermoformable polymeric film 16 is thermoformed to form a cavity.

A first film/foil combination 12 is placed in the cavity. Film/foil combination 12 includes aluminum foil layers 22 and 26, as well as polymeric film layers 24 and 28.

Silica powder 10 is placed on the lined cavity 16. A second film/foil combination 14, preferably of about the same dimensions as first film/foil combination 12, is placed over the insulating material 10 and substantially in alignment with the first film/foil combination.

Second film/foil combination 14 includes aluminum foil layers 32 and 36, as well as polymeric film layers 34 and 38.

The lined cavity carrying the powder 10 and first and second film/foil combination 14 is introduced into a chamber of a vacuum skin packaging machine. A top web 18, made of a material or materials which can be heated and softened in a VSP process, is placed over the second film/foil combination, and then drawn by differential pressure or vacuum up onto a heated dome where the top web 18 is heated and softened. Thereafter, by vacuumization and/or reintroduction of pressure to the top of the top web, the heat and softened material 18 is placed over the second film/foil combination 14 and sealed to thermoformed film 16. As this application of the heated material takes place, the first and second film/foil combinations 12 and 14 are brought together in their adjoining areas around the periphery of the insulating material 10. Additionally, the interior surfaces of film/foil combinations 12 and 14 are pressed against the silica powder 10. In this manner, the powder 10 is substantially enclosed between film/foil combinations 12 and 14.

The insulating material 10 used in the present invention should be dry to insure good insulating properties and good vacuumization of the package.

In some cases, small gaps in the peripheral areas of the film/foil combinations may appear, but these can be at least partially offset by the proper selection of materials for thermoformed film 16 and top web 18. The thermoformed film 16 can be flexible, semirigid, or rigid, and can be selected for properties to enhance the properties chosen in the other materials of the vacuum panel. An alternative to the thermoformed film 16 is a substrate or support member which can be flat or a formed shape, and can be made from many different thermoplastic or non-thermoplastic materials such as paper or metal. This alternative is less desirable in applications where the bottom portion of the panel advantageously "cradles", along with the film/foil liner, the silica powder or other material. However, when other insulating materials are used, it may be desirable to use a flat or nearly flat substrate. Top web 18 can be chosen with the view of enhancing the properties of film/foil combinations 12 and 14.

A vacuum can be drawn at an appropriate point in the vacuum skin packaging sequence, and by conventional techniques and apparatus, to create a partial or total vacuum in the core of the final panel. This benefits the insulating properties of the vacuum panel and makes the invention particularly useful as an insulating panel in appliances such as freezers and refrigerators.

For instance, in one embodiment, the panel was constructed and then sealed around the periphery of the panel except for a small opening in the panel. This panel was then placed in the vacuum chamber and vacuumized to draw out the interior air of the panel through the small port.

A film/foil panel as described above can be placed in an oven or other heating means to weld the films and foils together.

In an alternative embodiment, first film/foil combination 12 is greater in length, in at least one dimension, than the second combination 14. Preferably, first combination 12 is greater in both dimensions than second combination 14. This approach permits the top web 18, after it has been heated and softened, to envelope not only the top of second film/foil combination 14, but also an extended portion of first film/foil combination 12. This serves to enhance the enclosure of the insulating material 10 by allowing the VSP top web 18 to in effect seal off possible gaps between the film/foil combinations after the VSP process has been completed.

Of course, an additional pouch can be used to prepackage the insulating material 10 before placement on first film/foil combination 12.

While the above invention has been described with respect to preferred embodiments, modifications will become apparent to those of skill in the art after review of this disclosure, and such modifications are deemed to be within the scope of the invention as defined below. For example, any of the steps of lining the cavity, placing the insulating material in the cavity, or placing the second film/foil combination on the insulating material, can be done either in a vacuum chamber or outside a vacuum chamber.

What is claimed is:

1. A method for making a film/foil panel comprising:
   a) forming a thermoformable film to form a cavity;
   b) lining the cavity with a first film/foil combination;
   c) placing an insulating material into the lined cavity;
   d) placing a second film/foil combination on the insulating material;
   e) applying a top web over the second film/foil combination and sealing the top web to the thermoformable film, by a vacuum skin packaging process;
   f) simultaneously with the application of the top web, bringing the first and second film/foil combinations together to substantially enclose the insulating material between the first and second film/foil combinations; and
   g) placing the assembly of steps (e) and (f) in a heating means to weld the films and foils of the film/foil combinations together.

* * * * *